United States Patent
Hunter et al.

(12) 
(10) Patent No.: US 6,223,172 B1
(45) Date of Patent: Apr. 24, 2001

(54) ADDRESS ROUTING USING ADDRESS-SENSITIVE MASK DECIMATION SCHEME

(75) Inventors: Van A. Hunter, San Jose; Milan Momirov, San Francisco, both of CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/107,039

(22) Filed: Jun. 29, 1998

Related U.S. Application Data

(60) Provisional application No. 60/063,785, filed on Oct. 31, 1997, provisional application No. 60/063,814, filed on Oct. 31, 1997, provisional application No. 60/063,813, filed on Oct. 31, 1997, and provisional application No. 60/063,947, filed on Oct. 31, 1997.

(51) Int. Cl.[7] ......................................... G06F 17/30
(52) U.S. Cl. .................................................. 707/3
(58) Field of Search ........................... 707/1–6; 711/200, 711/202, 205, 206, 207, 216; 370/392, 351; 709/238–244

(56) References Cited

U.S. PATENT DOCUMENTS

| | | | |
|---|---|---|---|
| 5,420,862 | * | 5/1995 | Perlman ................................ 370/401 |
| 5,446,881 | * | 8/1995 | Mammel, Jr. ............................ 707/1 |
| 5,781,772 | * | 7/1998 | Wilkinson, III et al. ................ 707/3 |
| 5,835,720 | * | 11/1998 | Nelson et al. ......................... 709/224 |
| 5,920,699 | * | 7/1999 | Bare ..................................... 709/225 |
| 5,946,679 | * | 8/1999 | Ahuja et al. ............................ 707/3 |

(List continued on next page.)

FOREIGN PATENT DOCUMENTS 620994    2/1992   (AU) .

OTHER PUBLICATIONS

C. Partridge, S. O. Bradner, G. Varghese, V. Hunter and H. Kanakia, "Big Fast Routers: Multi–Megapacket Forwarding Engines For Internet II", Networld/Interop'97, 17 pages.

P. Gupta, S. Lin and N. McKeown, "Routing Lookups In Hardware At Memory Access Speeds", submitted to IEEE Infocom '98, 8 pages.

A.J. McAuley & P. Francis, "Fast Routing Table Lookup Using CAMs", IEEE Infocom vol. 3, 1993, pages. 1382–1391.

(List continued on next page.)

*Primary Examiner*—Maria N. Von Buhr
(74) *Attorney, Agent, or Firm*—Blakely, Sokoloff, Taylor & Zafman, LLP

(57) ABSTRACT

A method and apparatus for efficiently performing a longest match search are provided. According to one aspect of the present invention, an entry in a forwarding database, a routing table, or the like is located using an improved longest match search. A mask is applied to an address, such as a destination Internet Protocol (IP) address, to determine a masked address that is to be used for purposes of locating a matching entry in the forwarding database. The forwarding database is searched for an entry that matches the masked address. Subsequent masks are produced by performing an address-sensitive decimation of the former mask. For example, the former mask may be shortened based upon the location of the least significant bit containing a one in the masked address. According to another aspect of the present invention, data forwarding employs the improved longest match search. Data is received at a port. An address is extracted from the data. A forwarding database is searched for a longest match for the address by comparing a portion of the address indicated by a mask to entries in the forwarding database and using progressively shorter masks, determined based upon the masked address, for each subsequent search until a matching entry is located. If a matching entry is found, the data is forwarded to a destination associated with the matching entry.

22 Claims, 9 Drawing Sheets

U.S. PATENT DOCUMENTS

| | | | | |
|---|---|---|---|---|
| 6,014,659 | * | 1/2000 | Wilkinson, III et al. | 707/3 |
| 6,061,368 | * | 5/2000 | Hitzelberger | 370/537 |
| 6,061,712 | * | 5/2000 | Tzeng | 709/202 |
| 6,067,574 | * | 5/2000 | Tzeng | 709/247 |

OTHER PUBLICATIONS

P. Newman, T. Lyon and G. Minshall, "Flow Labelled IP: A Connectionless Approach to ATM", IEEE Infocom vol. 3, 1996, pp. 1251–1260.

Y. Rekhter, B. Davie, D. Katz, E. Rosen and G. Swallow, "Cisco Systems— Tag Switching Architecture Overview", RFC2105, Feb. 1997, pp 1–11.

V. Srinivasan and G. Varghese, "Faster IP Lookups Using Controlled Prefix Expansion", Proceeding of ACM Sigmetrics, Sep. 98, pp. 1–21.

M. Waldvogel, G. Varghese, J. Turner and B. Plattner, "Scalable High Speed IP Routing Lookups", Computer Communication Review, ACM Sigcomm, vol. 27, No. 4, Oct. 1997, pp. 25–36.

M. Degermark, A. Brodnik, S. Carlsonn and S. Pink, "Small Forwarding Tables For Fast Routing Lookups", Computer Communication Review, ACM Sigcomm, vol. 27, No. 4, Oct. 1997, pp. 3–14.

W. Doeringer, G. Karjoth and M. Nassehi, "Routing On Longest–Matching Prefixes", IEEE/ACM Transactions on Networking, vol. 4, No. 1, Feb. 1996, pp. 86–97.

* cited by examiner

310 DESTINATION ADDRESS: 11.1.2.65    00001011.00000001.00000010.01000001

320 ROUTE #1    11.1.2.0/24    00001011.00000001.00000010.00000000

330 ROUTE #2    11.1.0.0/16    00001011.00000001.00000000.00000000

340 ROUTE #3    11.0.0.0/8    00001011.00000000.00000000.00000000

810 SEARCH KEY:    00001011.00000001.00000010.01000001

820 CURRENT MASK:    11111111.11111111.11111111.11111110

830 NEXT MASK:    11111111.11111111.11111111.00000000

BIT POSITION

BIT-WISE MASK DECIMATION

| ADDRESS (HEX) | ITERATION | MASK (HEX) | MASKED ADDRESS (HEX) |
|---|---|---|---|
| 0B 01 02 41 | 1 | FF FF FF FF | 0B 01 02 41 |
|  | 2 | FF FF FF FE | 0B 01 02 40 |
|  | 3 | FF FF FF FC | 0B 01 02 40 |
|  | 4 | FF FF FF F8 | 0B 01 02 40 |
|  | 5 | FF FF FF F0 | 0B 01 02 40 |
|  | 6 | FF FF FF E0 | 0B 01 02 40 |
|  | 7 | FF FF FF C0 | 0B 01 02 40 |
|  | 8 | FF FF FF 80 | 0B 01 02 00 ← MATCH |

ADDRESS-SENSITIVE MASK DECIMATION

| ADDRESS (HEX) | ITERATION | MASK (HEX) | MASKED ADDRESS (HEX) |
|---|---|---|---|
| 0B 01 02 41 | 1 | FF FF FF FF | 0B 01 02 41 |
|  | 2 | FF FF FF FE | 0B 01 02 40 |
|  | 3 | FF FF FF 80 | 0B 01 02 00 ← MATCH |
|  | 4 | FF FF 00 00 | 0B 01 00 00 |
|  | 5 | FF 00 00 00 | 0B 00 00 00 |

| ADDRESS | MASK |
|---|---|
| ... | |
| 00011000 00010000 00000010 00000000 | 11111111 11111111 11111111 00000000 — 1110 |
| 00011000 00010000 00000000 00000000 | 11111111 11111111 00000000 00000000 — 1115 |
| 00011000 00000000 00000000 00000000 | 11111111 00000000 00000000 00000000 — 1120 |

FIG. 11A (Prior Art)

| ADDRESS | MASK LENGTH |
|---|---|
| ... | |
| 00011000 00010000 00000010 00000000 | 11000 — 1125 |
| 00011000 00010000 00000000 00000000 | 01000 — 1130 |
| 00011000 00000000 00000000 00000000 | 00100 — 1135 |

FIG. 11B (Prior Art)

| ADDRESS + MASK INFORMATION |
|---|
| ... |
| 00011000 00010000 00000010 10000000 0 — 1140 |
| 00011000 00010000 10000000 00000000 0 — 1145 |
| ... |
| 00011000 10000000 00000000 00000000 0 — 1150 |

FIG. 11C

ADDRESS ROUTING USING ADDRESS-SENSITIVE MASK DECIMATION SCHEME

This application claims the benefit of U.S. Provisional Application No. 60/063,785, U.S. Provisional Application No. 60/063,814, U.S. Provisional Application No. 60/063,813, and U.S. Provisional Application No. 60/063,947 all filed Oct. 31, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a method and apparatus for efficiently decimating a mask and identifying a longest matching prefix of a given address in a forwarding database, a routing table, or the like.

2. Description of the Related Art

A network device's performance is based on how quickly it can forward a packet. Before a network device, such as a bridge, a router, or a Layer 2 or Layer 3 switch, can forward a packet, it must locate the most appropriate entry in its forwarding database corresponding to the destination address specified in the packet. As a result, address matching is a critical part of making a high-performance network device. In Transmission Control Protocol/Internet Protocol (TCP/IP), there might be several forwarding database entries that match a particular destination address. To assure proper delivery of the packet to its intended destination, network devices must use the most "specific" matching forwarding database entry. An IP address comprises a portion identifying a network prefix and a portion identifying a host number. An IP address with a longer network prefix describes a smaller set of destinations and is said to be more specific than an IP address with a shorter network prefix. Therefore, when forwarding traffic, a network device must choose the entry with the longest matching network prefix. The length of an entry's network prefix may be identified by a length attribute or by a mask, e.g., a contiguous mask of 1 bits followed by 0 bits, associated with the entry.

Due to its importance to network device performance, much time has been devoted to developing longest match searching algorithms. Referring now to FIG. 1, a prior approach for performing a longest match search using a patricia tree is described. In this example, the addresses in the forwarding database are represented in a binary tree data structure 100 (commonly referred to as a patricia tree in the context of searching for IP addresses). Each vertex represents a binary string comprising 1s and 0s. The root 105 is the null string. Two pointers originate at each vertex. The first pointer consists of the current binary string plus a 0 and the second pointer consists of the current binary string plus a 1. If no address in the forwarding database contains a particular vertex's binary string plus an additional binary digit, then that pointer is either null or points to a vertex indicating failure. Each vertex additionally has a flag associated with it that indicates whether the binary string, if terminated at that vertex, corresponds to a network prefix in the forwarding database. In FIG. 1, this flag is indicated with an asterisk. The data structure 100 of FIG. 1 represents a forwarding database consisting of the following addresses:

00001011.00000001.00000010.00000000 (11.1.2.0/24)
00001011.00000001.00000000.00000000 (11.1.0.0/16)
00001011.00000000.00000000.00000000 (11.0.0.0/8)
10101101.00000000.00000000.00000000 (173.0.0.0/8)
10101111.00000000.00000000.00000000 (175.0.0.0/8)
11110111.00000000.00000000.00000000 (247.0.0.0/8)

To search for the destination address 00001011.00000001.00000010.01000001 (11.1.2.65), the "0" pointer is followed from the root 105 and three additional times to arrive at vertex 110. At vertex 110, the "1" pointer is followed, then the "0" pointer of the subsequent vertex, and the "1" pointer is followed twice to arrive at vertex 115. Upon reaching vertex 115, it is noted that 00001011 is a valid network prefix in the forwarding database that matches the destination address. At this point, vertex 115 represents the longest match. However, the goal now becomes finding a longer match. The search continues, therefore, until a leaf vertex is reached or a failure occurs, e.g., attempting to follow a null pointer or reaching a vertex that indicates failure. Continuing with the present example, from vertex 115, the "0" pointer is followed seven times and subsequently the "1" pointer is followed to arrive at vertex 120, which is marked as being a network prefix in the forwarding database. Therefore, upon reaching vertex 120, it is noted that 00001011 00000001 is the longest match found thus far. From vertex 120, the "0" pointer is followed six times and subsequently the "1" pointer and the "0" pointer are followed to arrive at vertex 125. Next, the "0" pointer is followed, but 00001011 000000010 is not a valid network prefix in the forwarding database, thereby bringing an end to the search. Therefore, 00001011 00000001 is recognized as the longest match corresponding to the destination address (11.1.2.65).

A disadvantage of the longest match search described above and other software approaches, such as a binary search, is that the algorithm depends on knowing the result of the last memory access before it can issue the next memory access. For example, to traverse the patricia tree 100 of FIG. 1, data associated with the root vertex 105 must first be retrieved from memory before an address can be issued for purposes of fetching the next vertex. Similarly, each succeeding memory access is dependent on the last retrieved vertex. These approaches, while efficient in terms of the number of memory accesses required, make inefficient use of the idle time between memory accesses.

In light of the foregoing, what is needed is a more intelligent mechanism for performing a longest match search. In particular, it is desirable to decouple the next memory access from the results of the prior memory access. Additionally, rather than worrying about minimizing memory accesses, emphasis should be put on taking useful action during the memory accesses.

BRIEF SUMMARY OF THE INVENTION

A method and apparatus for efficiently performing a longest match search are described. According to one aspect of the present invention, an entry in a forwarding database is located using an improved longest match search. A mask is applied to an address to determine a masked address that is to be used for purposes of locating a matching entry in the forwarding database. The forwarding database is searched for an entry that matches the masked address. Subsequent masks are produced by performing an address-sensitive decimation of the former mask.

According to another aspect of the present invention, data forwarding employs the improved longest match search. Data is received at a port. An address is extracted from the data. A forwarding database is searched for a longest match for the address by comparing a portion of the address indicated by a mask to entries in the forwarding database and progressively shortening the mask based upon the address until a matching entry is located. If a matching entry is found, the data is forwarded to a destination associated with the matching entry.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 9 illustrates an exemplary mask sequence for bitwise mask decimation.

FIG. 10 illustrates an exemplary mask sequence for address-sensitive mask decimation.

FIGS. 11A and 11B illustrate prior approaches for storing an IP address and associated mask information in a forwarding database entry.

FIG. 11C illustrates a compact way of storing both an N-bit IP address and its mask length with N+1 bits according to one embodiment of the present invention.

DETAILED DESCRIPTION OF THE INVENTION

A method and apparatus for efficiently performing a longest match search are described. Using the teachings of the present invention, a network device may more quickly forward packet data since the longest match search for the most appropriate entry in the forwarding database is accelerated. According to one aspect of the present invention, a longest match for an address is located by progressively shortening a mask associated with the address until a matching forwarding database entry is found. A hash table index is generated based upon the portion of the address identified by the current mask (i.e., the portion of the address that is not masked off by the current mask). Because subsequent masks may be determined based upon the address itself, hash table indices for succeeding memory accesses may be generated without waiting for the results of a previous memory access. Advantageously, by decoupling the results of prior memory accesses from the determination of succeeding memory accesses, productive use can be made of the time that is typically idle, i.e., the time during memory accesses, in prior art solutions.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software. Importantly, while embodiments of the present invention will be described with reference to an Ethernet switch, the method and apparatus described herein are equally applicable to other types of network devices, such as routers, bridges, and the like. Additionally, while embodiments are illustrated assuming the use of Internet Protocol (IP) version 4 (IPv4) 32-bit addresses, the method and apparatus described herein are also applicable to shorter or longer address lengths, such as the 128-bit address formats expected towards the turn of the centruy in the deployment of IP Next Generation (IPng or IPv6).

An Exemplary Switching Device Architecture

Figure 1:
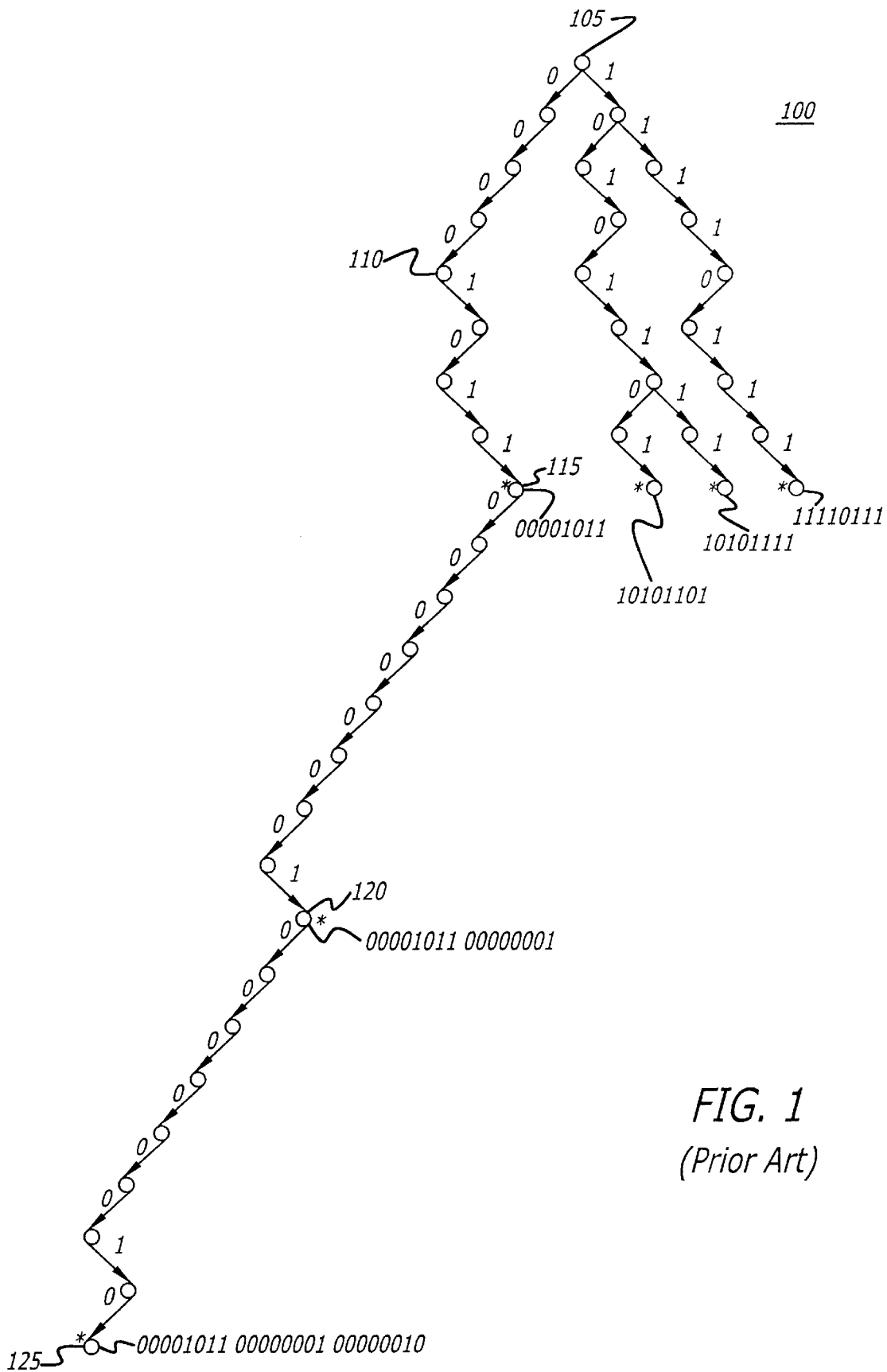
FIG. 1 illustrates a prior approach for performing a longest match search using a patricia tree.
Figure 2:
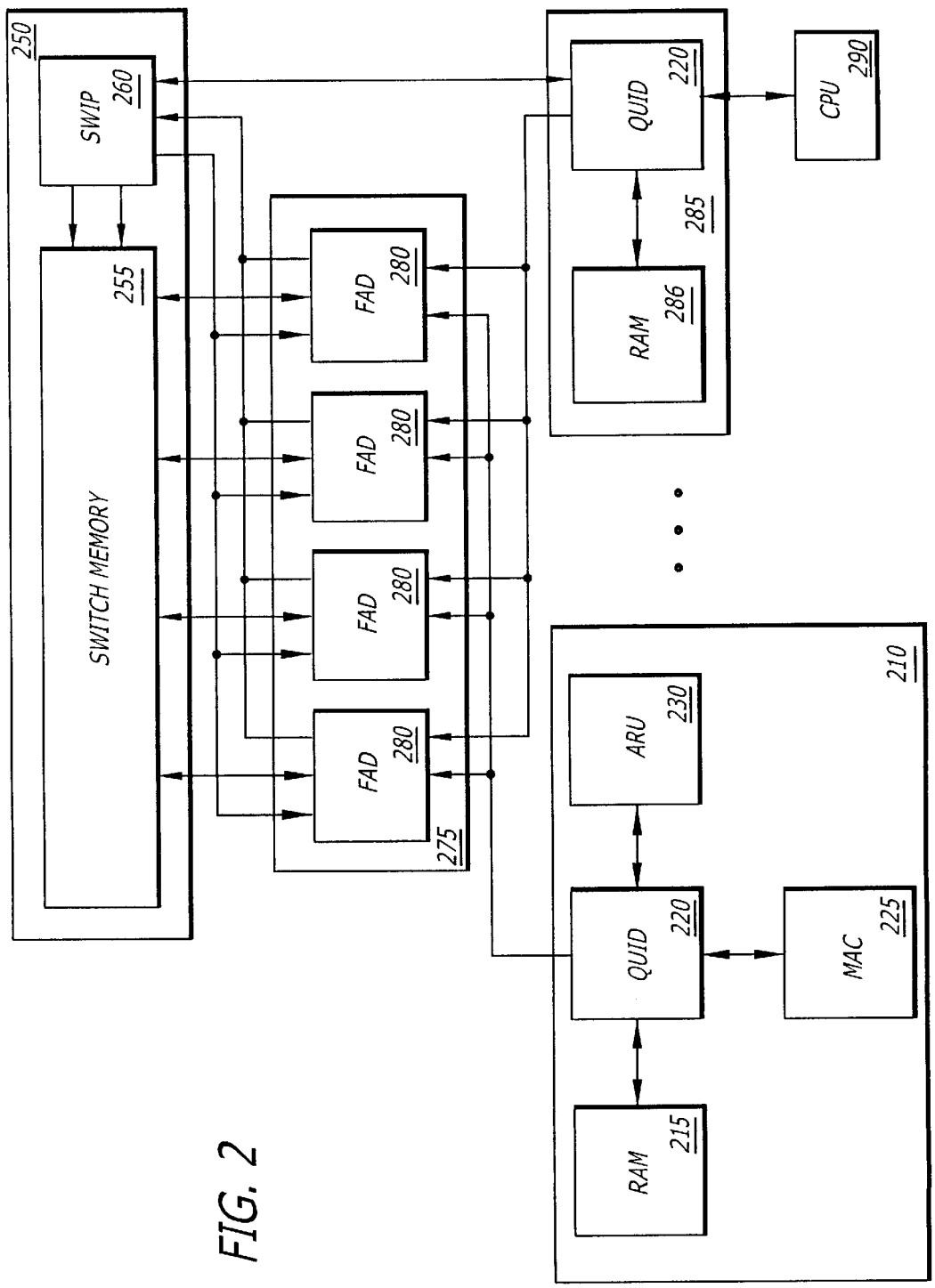
FIG. 2 is a block diagram of an exemplary packet forwarding device in which various embodiments of present invention may be implemented.

An overview of the architecture of a network device, e.g., switching device 200, in which an embodiment of the present invention may be implemented is illustrated by FIG. 2. According to the embodiment depicted, switching device 200 is an output buffered, shared memory switch. Switching device 200 includes a plurality of input/output (I/O) interfaces 210 coupled in communication with a switch core. The switch core comprises a switch fabric 250 and a fabric interface 275. Also coupled to the switch core via interface 285 is a central processing unit (CPU) 290 which may facilitate management of forwarding and filtering databases of the I/O interfaces 210.

Data, typically in the form of variable-length packets, enters the switching device 200 via one of the plurality of I/O interfaces 210. The inbound packet data is provided by the I/O interface 210 to the fabric interface 275 which steers the data through the switch fabric 250. When the packet data exits the switch fabric 250 it passes again through fabric interface 275 and ultimately to one or more I,O interfaces 210 from which the packet data is to be transmitted. The I/O interfaces 210 are coupled to the switch core though a bus interface 235 (also referred to as a "switch tap", a "tap bus," or simply a "tap"). The switch tap 235 moves packet data between the fabric interface 275 and the I/O interface 210. While for convenience, only one I/O interface 210 has been depicted, it should be appreciated the tap bus 235 may comprise a plurality of point-to-point buses coupling each I/O interface 210 to the fabric interface 275. The fabric interface 275 may be thought of conceptually as a large multiplexer (MUX)/demultiplexer (demux) with storage. The fabric interface 275 muxes the tap buses 235 into a bus 276 coupled to the switch fabric 250. Forwarding control bits from the packet data are also presented by the fabric interface 275 to the switch fabric 250 to facilitate cell queuing.

The switch fabric 250 includes a switch memory 255 and a switch processor (SWIP) 260. The SWIP 260 logically organizes the packet data read into the switch memory 255 by associating the packet data with one of a plurality of output queues. Additionally, the SWIP 260 controls the flow of data between the fabric interface 275 and the switch memory 255 and the flow of data between the fabric interface 275 and the I/O interfaces 210.

Referring again to the I/O interfaces 210, each may include one or more Port Interface Devices (PIDs), such as a Quad-port Interface Device (QUID) 220. The I/O interfaces 210 may each additionally include one or more Media Access Controllers (MACs) 225, Address Resolution Units (ARUs) 230, and memories 215. In one embodiment, one or more of the MACs 225 comprise 84C301 Seeq Quad 10/100 MAC devices which may support up to four 10/100 Megabit per second (Mbps) ports (not shown). While, for the sake of explanation, (CSMA/CD) is assumed to be the medium access method employed by the MACs 225, in alternative embodiments, the MACs 225 may operate according to other communication protocols, such as the well-known Fiber Distributed Data Interface (FDDI) or Asynchronous Transfer Mode (ATM) communication protocols.

In the present embodiment, packets are forwarded among QUIDs 220 through the switch core in the form of fixed-length cells. The QUID 220 fragments inbound packets (i.e., those received from the MAC 225) prior to providing them to the fabric interface 275 and performs reassembly upon outbound cells (i.e., those received from the fabric interface 275). As packets are read from the MAC 225, forwarding control information necessary for steering the packet through the switch fabric 250 to the QUID 220 at which the packet will exit (e.g., the egress PID) may be prepended and/or appended to packets and/or the associated fixed-length cells by the ingress PID (e.g., the QUID 220 upon which a particular packet is received).

The ingress PID interfaces with its associated ARU 230 to acquire forwarding control information associated with a packet. As the QUID 220 performs packet fragmentation, an address look-up request, which contains the destination Network layer address to which the packet is addressed (e.g., the destination Internet Protocol (IP) address), may be sent to the ARU 230. Upon completion of the address look-up, the ARU 230 returns the forwarding control information associated with the packet. Typically, the ARU 230 processes address look-up requests in the order received. The ARU processing may include performing Layer 2, e.g., Media Access Control (MAC) layer, or Layer 3, e.g., Network layer, address look-up to determine the forwarding control information such as, a destination address. The ARU 230 performs routing using the longest best match, thus supporting Classless Inter-Domain Routing (CIDR) and Variable Length Subnet Masks (VLSM). According to one embodiment, the ARU 230 implements an improved longest match search which locates the longest match of a given search key in the forwarding database more quickly than by traditional approaches. In this manner, packets are forwarded more quickly and the overall performance of the network device is enhanced. The improved longest match search and exemplary functional units for implementing the search will be described further below.

According to the embodiment depicted, the fabric interface 275 comprises a plurality of fabric access devices (FADs) 280. Cells may be exchanged between the QUIDs 220 and the FADs 280 by handshaking with the SWIP 260. Each FAD 280 muxes the tap buses 235 coupled to the PIDs 220 into the bus 276 coupled to the switch memory 255. According to one embodiment, the FADs 280 each accept a slice of the tap bus width. For example, for a 32-bit tap bus 235 each FAD 280 would accept mutually exclusive 8-bit slices during tap bus cycles. Each FAD 280 may buffer a plurality of cells in either direction (e.g., transmit or receive). Additionally, FADs 280 include a data path 276 and control path 265, for conveying cell data and forwarding control information to the switch memory 255 and SWIP 260, respectively. In one embodiment, the FAD-SWIP and FAD-switch memory interfaces may be implemented as described in copending patent application Ser. No. 09/036, 374, entitled "Early Availability of Forwarding Control Information" and assigned to the assignee of the present invention.

Returning to the switch fabric 250, in one embodiment the switch memory 255 is implemented with a 64K×256 pipelined synchronous static random access memory (SRAM). However, it is appreciated that various other types of random access memory (RAM) may be employed to provide for the temporary storage of cells received from the fabric interface 275. Above, it was mentioned that the SWIP 260 controls the movement of cells between the fabric interface 275 and the QUIDs 220 and manages the storage and retrieval of data to and from the switch memory 255. Many different handshaking mechanisms are available for coordinating the exchange of cells between the QUIDs 220 and the FADs 280 and between the FADs 280 and the switch memory 255. For instance, the SWIP 260 may present read and write ready signals and receive read and write enable signals to control the flow of cells. Those of ordinary skill in the art will no doubt recognize various alternative approaches.

It is appreciated that each of the functional units described above may be implemented with hard wired circuitry, Application Specific Integrated Circuits (ASICs), one or more logic circuits, a processor or other components of a programmed computer that perform a series of operations dictated by software or firmware, or a combination thereof. Importantly, the present invention is not limited to a particular implementation of these functional units.

Brief Overview of the Longest Match Search Algorithm

It should be appreciated that address matching directly affects the performance of a network device, such as a bridge, a router, or a switch. As described above, before a network device can make a forwarding decision relating to a packet, it must locate the most appropriate entry in its forwarding database corresponding to a search key, typically a destination address, associated with or specified in the packet. Locating the appropriate entry involves performing a longest match search.

Figures 3, 8:
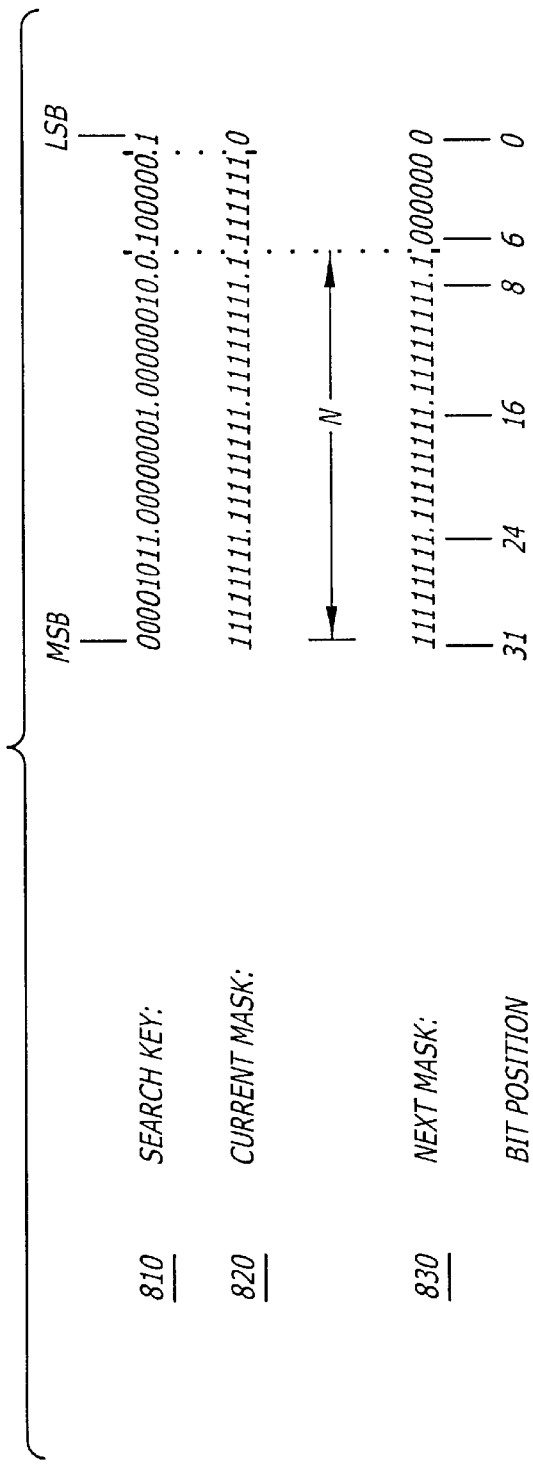
FIG. 3 illustrates a longest match search of a routing table that includes three matching network prefixes of varying lengths.
FIG. 8 illustrates address-sensitive mask decimation according to one embodiment of the present invention.

FIG. 3 illustrates a longest match search of a routing table that includes three matching network prefixes of varying lengths. In Transmission Control Protocol/Internet Protocol (TCP/IP), there might be several entries that match a particular address. In this example, network prefix 320 of route #1, network prefix 330 of route #2, and network prefix 340 of route #3 all match destination address 310. However, to assure proper delivery of the packet, a network device must use the most specific matching entry, i.e., the entry having the longest mask. Importantly, to be considered a matching entry, the address associated with the entry must match a portion of the search key identified by its mask and the entry's mask length must be less than or equal to the search key's mask length.

Throughout this application the "/<length>" convention will be used to identify a mask length associated with address information. For example, network prefix 320, 11.1.2.0, has a 24-bit mask, network prefix 330, 11.1.0.0, has a 16-bit mask, and network prefix 340, 11.0.0.0, has an 8-bit mask. Therefore, the most specific matching entry for destination address 310 is the entry containing network prefix 320.

Overview of Data Forwarding in a Packet Forwarding Device

Figure 4:
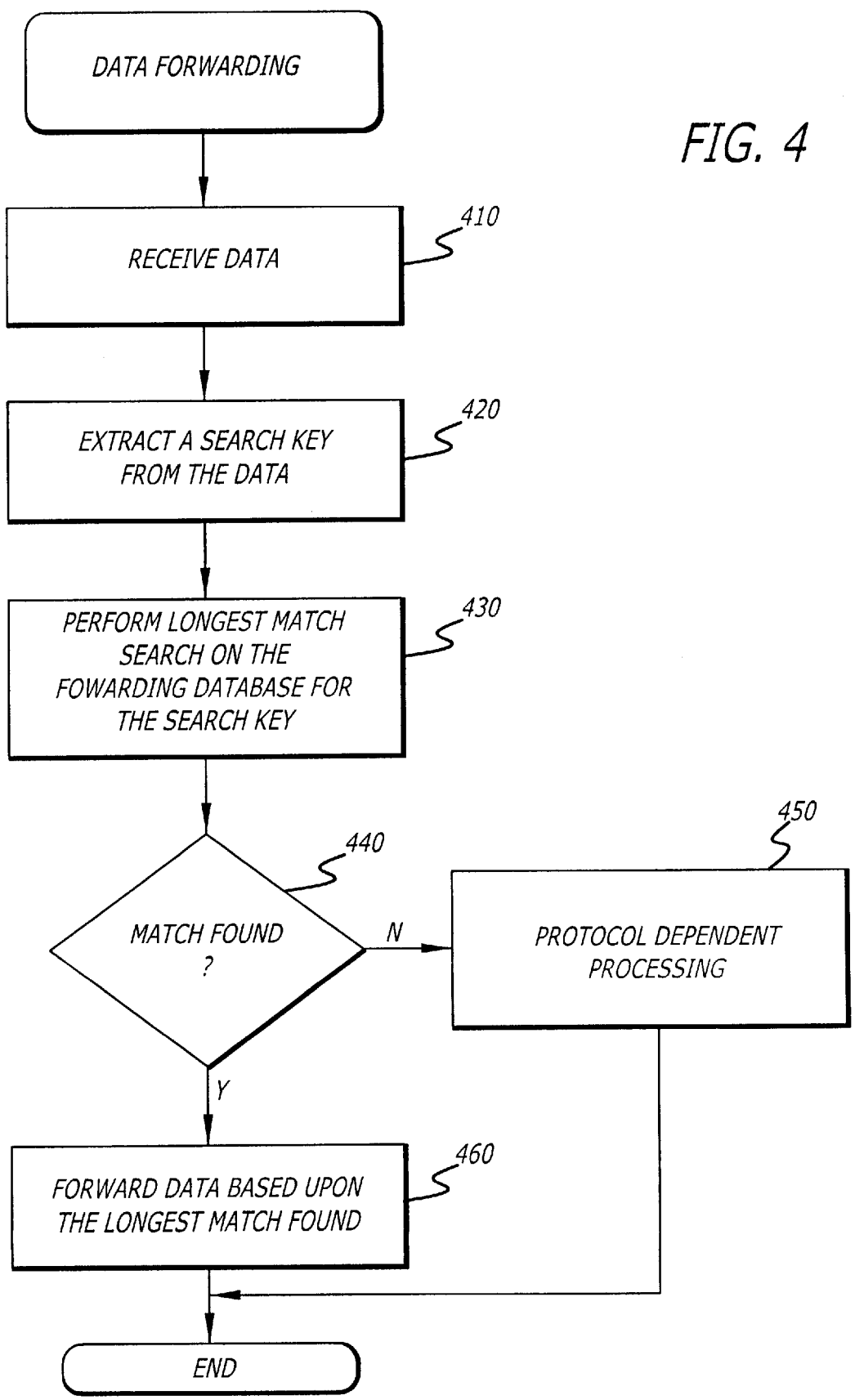
FIG. 4 is a flow diagram illustrating data forwarding processing according to one embodiment of the present invention.

FIG. 4 is a flow diagram illustrating data forwarding processing according to one embodiment of the present invention. At step 410, data is received at one of the I/O interfaces 210. A search key is extracted from the data at step 420. For an Internet Protocol (IP) packet, the search key typically comprises the source or destination IP address embedded in the packet's header. At step 430, a longest match search is performed to locate the most appropriate forwarding database entry for the search key. A determination is made at step 440 if a match was found. If a match was not found for the search key, then various protocol dependent processing may take place at step 450 depending upon the implementation. For example, the data may be forwarded to the CPU for resolution of a default route. Assuming a match was found, at step 460, the data may then be forwarded to a destination associated with the matching entry.

Exemplary Functional Units of an Address Resolution Unit

Figure 5:
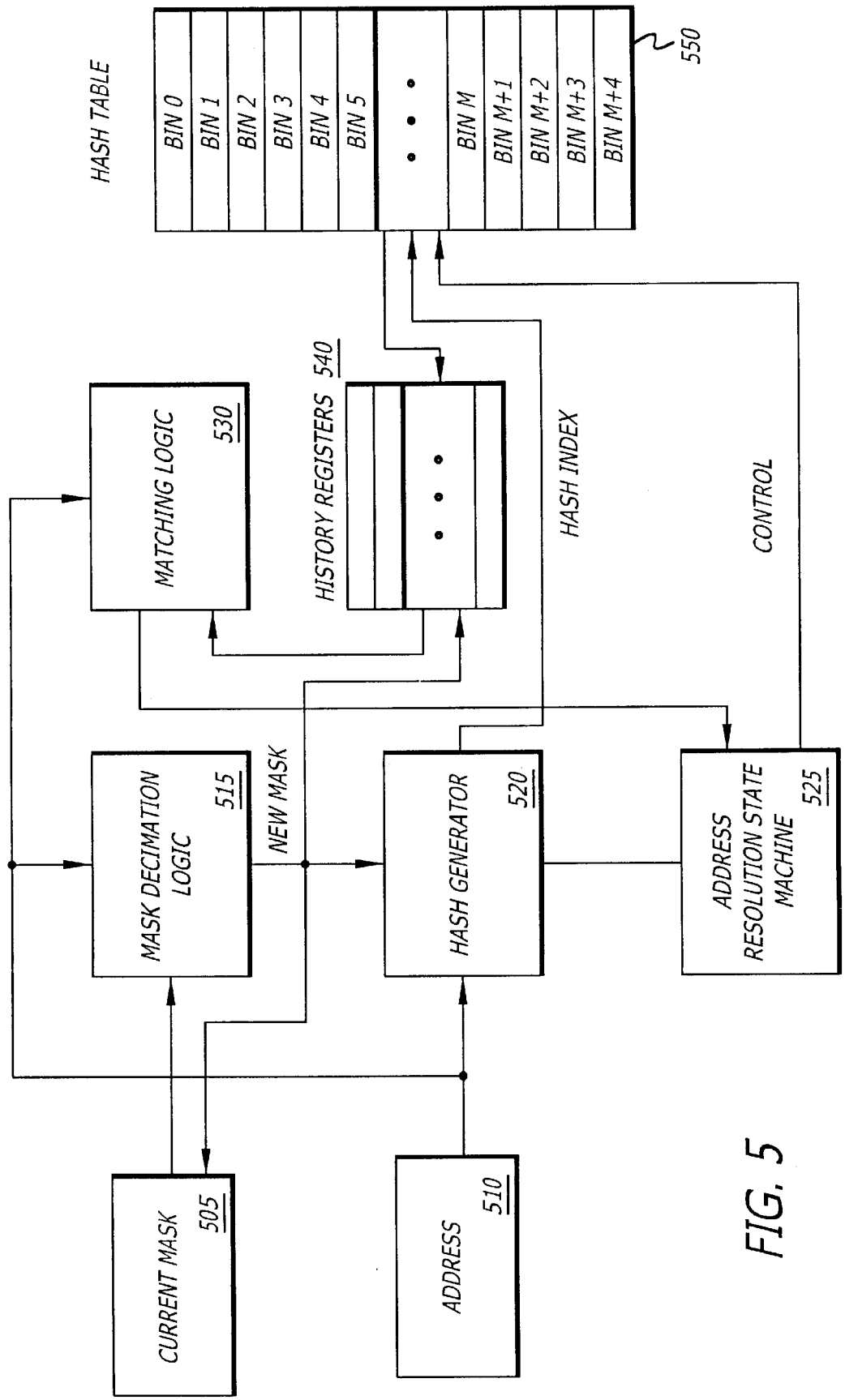
FIG. 5 illustrates the interaction of various functional units of an address resolution unit according to one embodiment of the present invention.

FIG. 5 illustrates the interaction of various functional units of an address resolution unit, such as ARU 230, according to one embodiment of the present invention. According to this simplified example, the ARU includes mask decimation logic 515, a hash generator 520, an address resolution state machine 525, matching logic 530, a set of history registers 540, and a hash table 550. The address resolution state machine 525 controls hash index generation, e.g., memory address generation, based on the search key, typically an address from a packet header, data in or pointed to by the hash table 550, and comparisons between the two.

The hash table 550 may be stored in a random access memory (RAM) (not shown), such as synchronous RAM (SRAM). In one embodiment, the hash table 550 contains a plurality of bins, each of which may include one or more address records (also referred to as forwarding database entries). A hash collision occurs when two or more entries hash to the same bin. When a hash bin collision occurs, the entries in the bin should be ordered from longest mask first to shortest mask last to assure the first match found is the longest. In an alternative embodiment, rather than hashing directly to the bin, a layer of indirection may be employed by storing pointers to forwarding database entries in the hash table.

At any rate, the hash generator 520 produces a hash index based on the address 510 and a mask. An initial hash index is typically based upon the whole address, while indices for subsequent search iterations are based upon a portion of the address remaining after applying progressively shorter masks each iteration. According to one embodiment, the hash index is a 16-bit key produced by a CRC-CCITT generator using $X^{16}+X^{12}+X^5+1$ as the CRC polynomial.

Based upon the current mask 505 and an address 510, the mask decimation logic 515 shortens the mask just enough to cause the hash generator to produce a hash index that is different from the previous hash index. In this manner, the improved longest match search avoids searching the same bin twice. Using the hash generation scheme described above, dropping zero bits from the address does not change the resulting hash index, however, dropping a one bit from the address does result in a different hash index. Therefore, by masking off the rightmost one bit, i.e., the least significant bit containing a one, in the address, the address is shortened by just enough to force the longest match search to search a different bin on each iteration. Importantly, because this approach to mask decimation is not dependent upon results of a memory access, a new hash index may be generated each clock.

The history registers 540 may be used to store data retrieved from the forwarding database or pointers to forwarding database entries retrieved from hash table 550, but not yet examined. The history registers 540 are useful because of the pipelined nature of SRAM and its interaction with the ARU 230. The address resolution state machine 525 causes the hash generator 520 to output a hash index to the memory. However, because it will be a couple of clocks before data is loaded from the location of the hash table 550 identified, the address resolution state machine continues to cause further hash indices to be output. Matching logic 530 includes one or more comparators for comparing the search key with forwarding database entries retrieved from the memory.

The present invention is not intended to be limited to a particular implementation of these functional units. The functional units may be implemented with hard wired circuitry, Application Specific Integrated Circuits (ASICs), one or more logic circuits, a processor or other components of a programmed computer that perform a series of operations dictated by software or firmware, or a combination thereof.

Improved Longest Match Search

Figure 6:
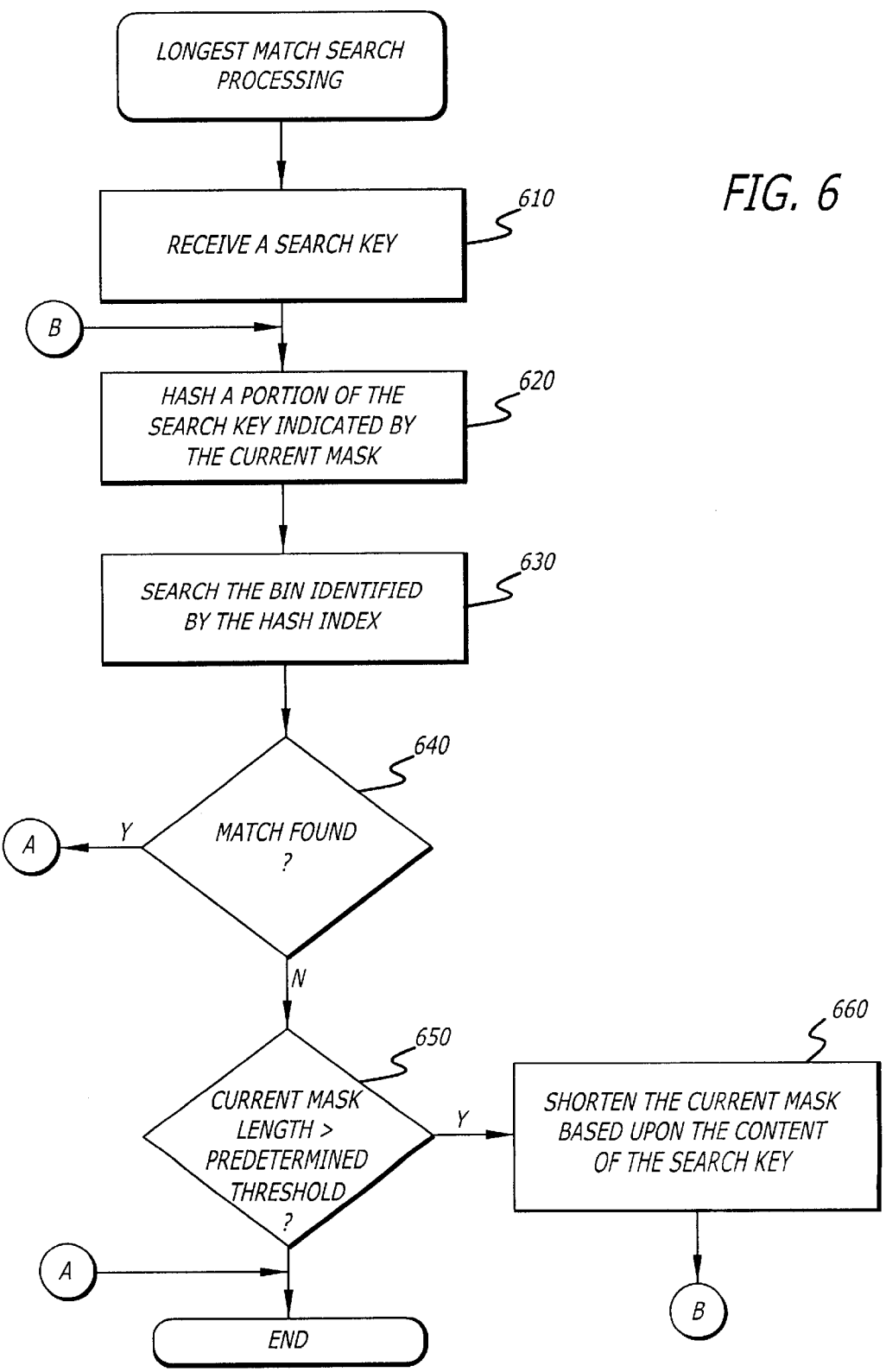
FIG. 6 is a flow diagram illustrating longest match search processing according to one embodiment of the present invention.

Having described exemplary functional units of ARU 230, longest match search processing will now be described with reference to FIG. 6. The steps may be performed under the control of a programmed processor, such as CPU 290, or the logic may be implemented and distributed among hardware, firmware, software, or a combination thereof within the ARU 230, the I/O interface 210 and/or the QUID 220, for example.

At step 610, a search key is received. Hash index generation is performed at step 620 based upon a mask and the masked search key. According to one embodiment, a CRC-16 generator may be employed to produce a 16-bit hash index. Other well known hashing mechanisms may be employed in alternative embodiments. Additionally, the hash index may be longer or shorter depending upon the size chosen for the hash table. The hash bin identified by the hash index is searched for an entry matching the masked search key at step 630. At step 640, a determination is made as to whether or not a match has been found. Recall, a match requires the entry's mask length to be less than or equal to the mask associated with the search key and the masked search key must be equivalent to the address information associated with the entry. Therefore, match determination includes determining the entry's mask length and if the mask length is less than or equal to the search key's mask, then comparing the masked search key to the entry's address information. If one or both prongs of the match determination fails for all of the entries associated with the current bin, then processing continues with step 650. However, if a matching entry is found, due to the ordering of entries in the bins (i.e., longest masks to shortest masks), it must be the longest match and the longest match search is complete.

At step 650, the current mask length is compared to a predetermined threshold. If the current mask length is greater than the predetermined threshold, then processing continues with step 660, otherwise no match has been found and the longest match search is complete. According to one embodiment the predetermined threshold is 8 bits.

At step 660, the current mask is shortened to cause enough data to be masked off of the search key such that the hash function employed will produce a different hash index than the previous hash index. As mentioned above, such a result may be achieved with a CRC generator by shortening the mask enough to drop the next one bit from the search key. Steps 620 through 660 are repeated until either a matching entry is located or the current mask is less than or equal to the predetermined threshold.

Figure 7:
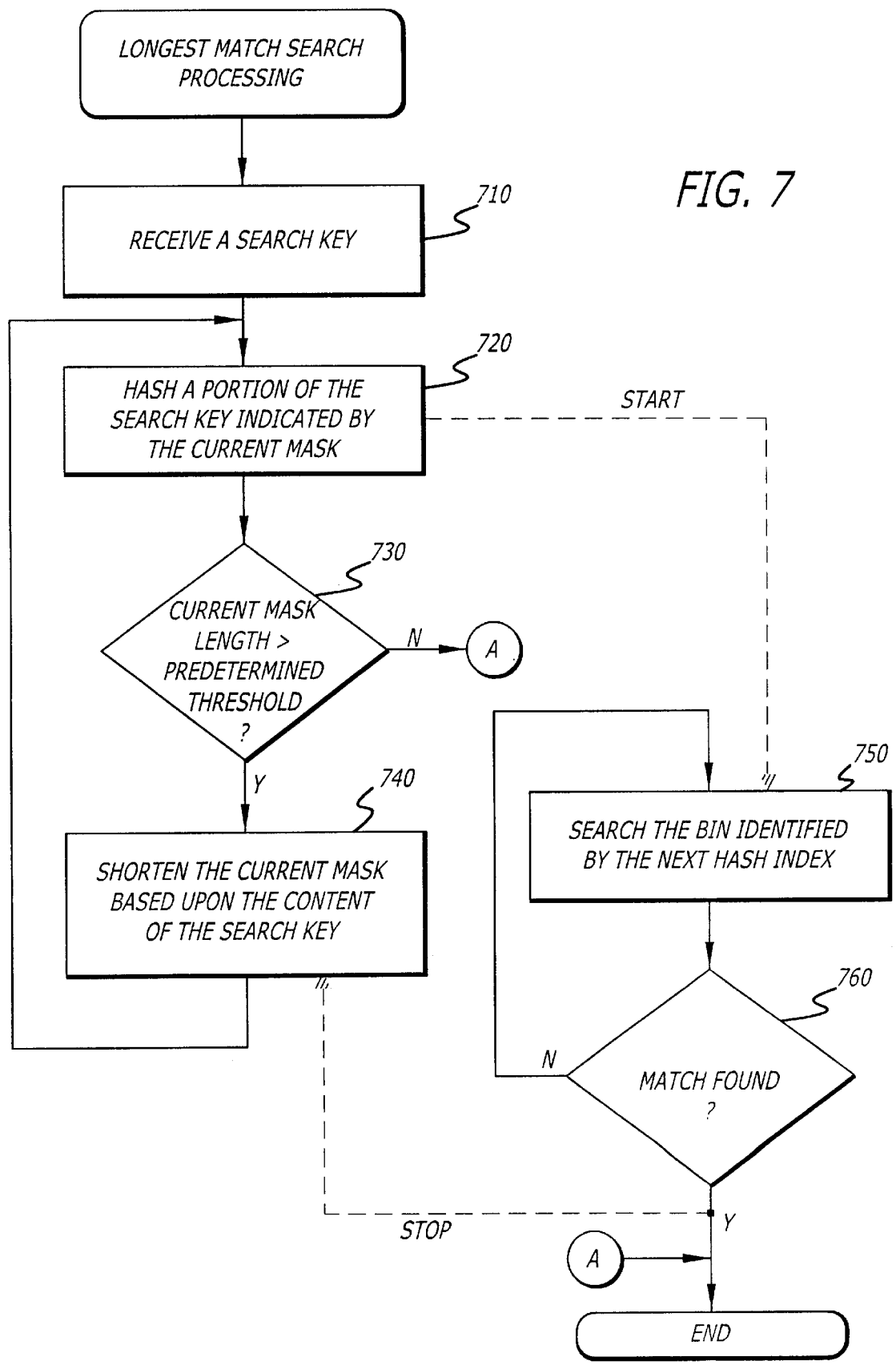
FIG. 7 is a flow diagram illustrating longest match search processing according to another embodiment of the present invention.

FIG. 7 is a flow diagram illustrating longest match search processing according to another embodiment of the present invention. In this example, the pipelined nature of the improved longest match search is illustrated. Two independent processing threads, a hash index generation thread and a search thread can be performed in parallel. The hash index generation thread is conceptually represented by steps 720 through 740. A new hash index may be generated on each clock until the mask is shortened to a predetermined threshold. The search thread is conceptually represented by steps 750 and 760. While a matching entry has not been found and at least one hash index is available, the search thread searches the hash bin identified by the next hash index. Importantly, the independent threads take advantage of the pipelined nature of the ARU's interaction with memory by making more efficient use of lags that typically occur during memory accesses. For example, the hash index generation thread can produce one or more new hash indices while the search thread is waiting for a forwarding database entry to be retrieved from memory.

At step 710, a search key is received. A hash index is generated at step 720 by performing a hash function on a portion of the search key that is not masked off by the current mask. That is, the hash function operates upon the masked search key. Once a hash index is available, the search thread, starting at step 750, may begin in parallel with the hash generation thread. At step 730, the current mask length is compared to a predetermined threshold. If the current mask length is greater than the predetermined threshold, then a new hash index can be generated and processing continues with step 740, otherwise no additional hash indices are generated and the hash generation thread is complete. The current mask is shortened based upon the content of the search key at step 740. The goal is to produce the longest possible mask that is shorter than the previously employed mask and that yields a new hash value. By a new hash value, what is meant is one that is different than the former hash value. At any rate, after decimating the mask, the hash generation thread continues at step 720.

Returning to the search thread, at step 750, the bin identified by the next available hash index is searched. At step 760, a determination is made as to whether a match has been found. Again, a match requires (1) the entry's mask length to be less than or equal to the mask associated with the search key and (2) the masked search key must be equivalent to the address information associated with the entry. Therefore, match determination includes determining the entry's mask length and comparing the entry's mask length to the search key's mask. If the entry's mask length is less than or equal to the search key's mask, then the masked search key is compared to the entry's address information for equality. This match determination is performed until a match is found or the end of the bin is reached. If no match is found, then processing continues with step 750. However, if a matching entry is found, due to the ordering of entries in the bins (i.e., longest masks to shortest masks), it must be the longest match and the search thread is complete. At this point, since no more hash indices are required, it may be desirable to halt the hash generation thread.

Address-sensitive Mask Decimation

Broadly speaking, what is meant by "address-sensitive" mask decimation is the creation of a new mask based upon the content of the former masked address. FIG. 8 illustrates address-sensitive mask decimation according to one embodiment of the present invention. The exemplary search key 810, current mask 820, and next mask 830 shown in this example illustrate how the current mask 820 may be shortened to produce the next mask 830 based upon the content of the search key 810. In this example, the least significant bit (LSB) is the rightmost bit and the most significant bit (MSB) is the leftmost bit. The current mask 820 is FF FF FF FE (hex) and the masked search key is 0B 01 02 40 (hex). As described above, to cause the hash function to produce a new hash index, at least one bit containing a one must be dropped. To accomplish this, the masked search key is scanned to locate the least significant bit containing a one. Of course, this scan need not be performed serially, it may be performed with combinatorial logic. At any rate, once the leftmost bit in the masked search key containing a one is located at a bit position Y (6 in this example). The new mask of length N is created that will cause the next least significant one bit to be masked off in the resulting masked search key. N is determined by subtracting the bit position of the leftmost bit in the masked search key containing a one, Y, from the bit position, X, of the search key's MSB (31 in this example). Therefore, the length of the new mask 830 is 25 (31-6). Advantageously, rather than wasting time by potentially searching the same bin in successive search iterations, address-sensitive mask decimation causes a new hash index to be produced for each search iteration.

To illustrate the accelerated performance achieved by this novel address-sensitive mask decimation approach, a mask sequence for bit-wise mask decimation will now be compared to a mask sequence for address-sensitive mask decimation.

FIG. 9 illustrates an exemplary mask sequence and resulting masked addresses for bit-wise mask decimation. At iteration 1, the mask begins with all ones, thereby searching with the complete search key. At iteration 2 and each subsequent iteration, the mask is shortened by only a single bit. Using this approach, the longest match for destination address 310 shown in FIG. 3 would be found in the exemplary routing table containing network prefix 320 of route #1, network prefix 330 of route #2, and network prefix 340 of route #3 in eight search iterations.

FIG. 10 illustrates an exemplary mask sequence and resulting masked addresses for an address-sensitive mask decimation according to one embodiment of the present invention. As above, at iteration 1, the mask begins with all ones. However, in contrast to the mask sequence illustrated above, each new mask produces a different masked address, thereby causing a new hash value to be produced by the hash function. In this example, each iteration shortens the mask such that the least significant bit containing a one in the former masked address is dropped. Therefore, the longest match search is accelerated by skipping duplicate masked addresses. Using this accelerated approach, the longest match for destination address 310 is located in three search iterations rather than the eight iterations required by the bit-wise mask decimation approach illustrated above.

Storing an Address and Mask Information in a Record

Further efficiencies in terms of storage space for forwarding database entries may be achieved by employing a novel method for compactly representing an address and its associated mask. FIGS. 11A and 11B illustrate prior approaches for storing an IP address and associated mask information in a forwarding database entry. In FIG. 11A, each of the entries 1110, 1115, and 1120 include N-bits of address information (e.g., a network prefix) and an associated mask of length N. The entries 1125, 1130, and 1135 of FIG. 11B use less space by storing the length of the corresponding mask rather than the entire N-bit mask for each entry. However, as illustrated by FIG. 11C, further efficiency may be achieved by embedding a mask length indicator within the address information itself. FIG. 11C illustrates a compact way of storing both an N-bit IP address and its mask length with N+1 bits according to one embodiment of the present invention. In this example, a one bit is inserted into the address to split the significant portion from the insignificant portion of the address. Therefore, the first one bit encountered in a scan from LSB to MSB is the mask length indicator. The mask length for an entry may be determined by subtracting the bit position of the mask length indicator from the bit position of the MSB of the address.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of locating an entry in a forwarding database corresponding to a longest match of an address, the method comprising the steps of:
    a) applying a mask to the address to determine a masked address that is to be used for purposes of locating a matching entry in the forwarding database;
    b) searching the forwarding database for an entry that matches the masked address;
    c) performing an address-sensitive decimation of the mask to produce a new mask; and
    d) until a predetermined condition has been met, repeating steps a–c with the new mask.

2. The method of claim 1, further comprising the step of performing a hash function on the masked address to produce an index into a hash table.

3. The method of claim 2, wherein the step of performing an address-sensitive decimation of the mask to update the mask comprises shortening the mask such that the application of the mask to the address will exclude enough data to cause the hash function to produce a result that is different from the former index.

4. The method of claim 3, wherein the step of shortening the mask such that the application of the mask to the address will exclude enough data to cause the hash function to produce a result that is different from the former index comprises shortening the length of the mask to X-Y bits, where X represents the bit position of the most significant bit in the address, and where Y represents the bit position of the least significant bit containing a one.

5. The method of claim 1, wherein the predetermined condition comprises a matching entry has been located or the length of the mask is equal to a predetermined threshold.

6. The method of claim 1, wherein one or more new masks are generated in parallel with the step of searching the forwarding database for a matching entry.

7. The method of claim 1, wherein each entry in the forwarding database includes N-bits of address and an associated mask length encoded in N+1 bits of address information, and the step of searching the forwarding database for a matching entry comprises the steps of:
    determining the mask length associated with an entry based upon the location of a mask length identification marker within the address information;
    comparing the mask length associated with the entry with the mask that has been applied to the address; and
    if the mask length associated with the entry is less than or equal to the mask that has been applied to the address, then comparing a significant portion of the address information with the masked address, the significant portion of the address information being identified by the mask length associated with the entry.

8. The method of claim 7, wherein the mask length identification marker comprises the least significant bit in the address information containing a one, and wherein the step of determining the mask length associated with an entry based upon the location of a mask length identification marker within the address information comprises scanning the address information to locate the bit position of the least significant bit containing a one.

9. A method of locating an entry in a forwarding database corresponding to a longest match of a search key, the method comprising the steps of:
    a) searching the forwarding database for an entry that matches the search key; and
    b) if no entry matches the search key, then
        1) scanning the search key to locate the least significant bit containing a one,
        2) shortening the search key to exclude the least significant bit containing a one,
        3) searching the forwarding database for an entry that matches the search key, and
        4) repeating steps 1–3 until the search key is equal to a predetermined length or until the longest match is located.

10. The method of claim 9, wherein the step of shortening the search key to exclude the least significant bit containing a one comprises the steps of:
    providing a mask of length X-Y, where X represents the bit position of the most significant bit in the search key, and where Y represents the bit position of the least significant bit containing a one; and
    applying the mask to the search key.

11. The method of claim 9, wherein the search key comprises a destination Internet Protocol (IP) address.

12. The method of claim 9, wherein the search key comprises a source Internet Protocol (IP) address.

13. A method of forwarding data comprising the steps of:
receiving data at a port;
extracting an address from the data;
searching a forwarding database for a longest match for the address by
comparing a portion of the address indicated by a mask to entries in the forwarding database, and
progressively shortening the mask based upon the address until a matching entry is located; and
forwarding the data to a destination associated with the matching entry.

14. The method of claim 13, further comprising the step of performing a hash function on the portion of the address to produce an index into a hash table.

15. The method of claim 14, wherein the step of progressively shortening the mask based upon the address comprises, for each search iteration, shortening the mask such that the application of the mask to the address will exclude enough data to cause the hash function to produce a result that is different from the former index.

16. The method of claim 13, wherein the step of progressively shortening the mask based upon the address until a matching entry is located comprises, for each search iteration, shortening the length of the mask to X-Y bits, where X represents the bit position of the most significant bit in the address, and where Y represents the bit position of the least significant bit containing a one.

17. The method of claim 13, wherein each entry in the forwarding database includes N-bits of address and an associated mask length encoded in N+1 bits of address information, and the step of comparing a portion of the address indicated by a mask to entries in the forwarding database comprises the steps of:
determining the mask length associated with an entry based upon the location of a mask length identification marker within the address information;
comparing the mask length associated with the entry with the mask; and
if the mask length associated with the entry is less than or equal to the mask, then comparing a significant portion of the address information with the portion of the address indicated by the mask, the significant portion of the address information being identified by the mask length associated with the entry.

18. The method of claim 17, wherein the mask length identification marker comprises the least significant bit in the address information containing a one, and wherein the step of determining the mask length associated with an entry based upon the location of a mask length identification marker within the address information comprises scanning the address information to locate the bit position of the least significant bit containing a one.

19. The method of claim 13, wherein the address comprises a 32-bit or a 128-bit Internet Protocol (IP) address.

20. A method of locating an entry in a forwarding database corresponding to a longest match of a search key, the method comprising the steps of:
a) performing a hash function on the search key to produce a current index into a hash table;
b) searching a first bin in the hash table identified by the current index for an entry that matches the search key; and
c) while no entry is found that matches the search key and while the search key is greater than a predetermined length, with each subsequent search iteration performing the steps of
1) shortening the search key to exclude just enough data to cause the hash function to produce a result that is different than the current index;
2) updating the current index with the result of the hash function on the shortened search key; and
3) searching a different bin in the hash table that is identified by the current index.

21. A method of locating an entry in a forwarding database corresponding to a longest match of a search key, the method comprising the steps of:
a) generating indices for a hash table by performing a hash function on the search key to produce a current index into a hash table;
b) searching a first bin in the hash table identified by the current index for an entry that matches the search key; and
c) while no entry has been found that matches the search key and while the length of the search key is greater than a predetermined length, with each subsequent search iteration performing the steps of
1) shortening the search key to exclude just enough data to cause the hash function to produce a result that is different than the current index;
2) updating the current index with the result of the hash function on the shortened search key; and
3) searching a different bin in the hash table that is identified by the current index.

22. A networking device comprising:
a fabric and
a plurality of input/output (I/O) interfaces coupled to the fabric,
each of the plurality of I/O cards comprising
a plurality of ports,
a forwarding and filtering mechanism coupled to the plurality of ports, the forwarding and filtering mechanism configured to forward data based upon the results of a longest match search of a forwarding database for an entry corresponding to an address contained within the data, where:
a mask is applied to the address to determine a masked address to be used for purposes of searching the forwarding database,
the forwarding database is searched for entries that match the masked address, and
subsequent masks are produced based upon an address-sensitive decimation of the mask.

* * * * *